(12) United States Patent
McCulloch

(10) Patent No.: US 7,543,407 B2
(45) Date of Patent: Jun. 9, 2009

(54) HUMANE LEG HOLD TRAP

(76) Inventor: James A. McCulloch, 806 Village Green, Angola, IN (US) 46703

( * ) Notice: Subject to any disclaimer, the term of this patent is extended or adjusted under 35 U.S.C. 154(b) by 247 days.

(21) Appl. No.: 11/146,821

(22) Filed: Jun. 7, 2005

(65) Prior Publication Data

US 2005/0274057 A1 Dec. 15, 2005

Related U.S. Application Data

(60) Provisional application No. 60/578,256, filed on Jun. 9, 2004.

(51) Int. Cl.
*A01M 23/34* (2006.01)
(52) U.S. Cl. ............................................. 43/86; 43/85
(58) Field of Classification Search ............... 43/85–87, 43/96, 58, 61, 77, 81
See application file for complete search history.

(56) References Cited

U.S. PATENT DOCUMENTS

| | | | | |
|---|---|---|---|---|
| 108,876 A | * | 11/1870 | Bunnell | 43/86 |
| 116,743 A | * | 7/1871 | Ovaitt | 43/86 |
| 122,318 A | * | 1/1872 | Hart | 43/86 |
| 180,315 A | * | 7/1876 | Bates et al. | 43/86 |
| 221,329 A | * | 11/1879 | Lewthwaite | 43/81 |
| 253,907 A | * | 2/1882 | Andre | 43/61 |
| 314,133 A | * | 3/1885 | Jarvis | 43/86 |
| 384,415 A | * | 6/1888 | Beach | 43/86 |
| 400,324 A | * | 3/1889 | Gilmore | 43/86 |
| 450,545 A | * | 4/1891 | Warner | 43/86 |
| 465,056 A | * | 12/1891 | Edwards | 43/86 |
| 543,206 A | * | 7/1895 | Butzer | 43/86 |
| 551,412 A | * | 12/1895 | Stephens | 43/86 |
| 667,531 A | * | 2/1901 | Kammerer et al. | 43/86 |
| 718,853 A | * | 1/1903 | Merritt | 43/81 |
| 871,989 A | * | 11/1907 | Gates | 43/86 |
| 872,041 A | * | 11/1907 | Armstrong et al. | 43/86 |
| 895,017 A | * | 8/1908 | Hooker | 43/86 |
| 1,216,918 A | * | 2/1917 | Armbruster | 43/61 |
| 1,454,015 A | * | 5/1923 | Schuetz | 43/96 |
| 1,496,421 A | * | 6/1924 | Koranicki | 43/85 |
| 1,686,432 A | * | 10/1928 | Bleck | 43/61 |
| 1,805,317 A | * | 5/1931 | Schober | 43/86 |
| 1,951,296 A | * | 3/1934 | Kleffman | 43/85 |
| 1,989,174 A | * | 1/1935 | Schwenk | 43/85 |
| 1,996,872 A | * | 4/1935 | Long | 43/61 |
| 2,146,464 A | * | 2/1939 | Briddell | 43/96 |
| 2,284,543 A | * | 5/1942 | Stilson | 43/86 |
| 2,348,002 A | * | 5/1944 | Glass | 43/86 |
| 2,492,957 A | * | 1/1950 | Blair | 43/81 |
| 2,529,589 A | * | 11/1950 | Biery | 43/61 |
| 2,581,324 A | * | 1/1952 | Knox | 43/82 |
| 2,589,002 A | * | 3/1952 | Vonada | 43/61 |
| 2,620,589 A | * | 12/1952 | Jones | 43/61 |

(Continued)

FOREIGN PATENT DOCUMENTS

CA 2068287 A * 11/1993

(Continued)

*Primary Examiner*—Darren W Ark
(74) *Attorney, Agent, or Firm*—Taylor & Aust, P.C.

(57) ABSTRACT

A trap including a housing having an inner wall and a first opening and a trigger that is inserted into the first opening. The trigger having an edge contacting the inner wall when the trap is armed.

12 Claims, 3 Drawing Sheets

U.S. PATENT DOCUMENTS

| | | | | |
|---|---|---|---|---|
| 2,683,951 A * | 7/1954 | Hamaker | | 43/61 |
| 2,894,352 A * | 7/1959 | McDonald | | 43/87 |
| 3,178,849 A * | 4/1965 | Pradon | | 43/96 |
| 4,158,929 A * | 6/1979 | Custard | | 43/61 |
| 4,175,351 A * | 11/1979 | Souza | | 43/90 |
| 4,184,282 A * | 1/1980 | Lifshutz | | 43/90 |
| 4,187,634 A * | 2/1980 | Kintz | | 43/61 |
| 4,306,370 A * | 12/1981 | Lindblad | | 43/86 |
| 4,341,033 A * | 7/1982 | Siegel | | 43/81 |
| 4,425,732 A * | 1/1984 | Kania | | 43/85 |
| 4,462,182 A * | 7/1984 | French | | 43/85 |
| 4,471,560 A * | 9/1984 | Hughan | | 43/86 |
| 4,483,093 A * | 11/1984 | Isborn | | 43/61 |
| 4,557,068 A * | 12/1985 | Thomas et al. | | 43/96 |
| 4,569,149 A * | 2/1986 | Sensing et al. | | 43/61 |
| 4,578,893 A * | 4/1986 | Wickenberg | | 43/85 |
| 4,601,128 A * | 7/1986 | Danison | | 43/87 |
| 4,633,610 A * | 1/1987 | Thompson | | 43/85 |
| 4,735,011 A * | 4/1988 | Spillett | | 43/86 |
| 4,739,578 A * | 4/1988 | Pitchford, Jr. | | 43/87 |
| 4,802,301 A * | 2/1989 | Isborn et al. | | 43/61 |
| 4,866,876 A * | 9/1989 | Thompson | | 43/96 |
| 5,062,237 A * | 11/1991 | Kitagawa et al. | | 43/86 |
| 5,109,627 A * | 5/1992 | Lee | | 43/87 |
| 5,309,667 A * | 5/1994 | Ladzinski | | 43/87 |
| 5,706,601 A * | 1/1998 | Dail | | 43/81 |
| 6,658,787 B1 * | 12/2003 | Bonnot | | 43/87 |
| 2007/0266618 A1 * | 11/2007 | Sturgeon et al. | | 43/85 |

FOREIGN PATENT DOCUMENTS

| | | | | |
|---|---|---|---|---|
| CA | 2297627 A1 | * | 8/2001 |
| DE | 3321995 A1 | * | 12/1984 |
| DE | 1005008942 A1 | * | 8/2006 |
| EP | 638234 A1 | * | 2/1995 |
| GB | 2095526 A | * | 10/1982 |
| GB | 2264853 A | * | 9/1993 |
| JP | 4-91743 A | * | 3/1992 |
| JP | 8-322452 A | * | 12/1996 |
| JP | 2002-153194 A | * | 5/2002 |
| WO | WO-93/10661 A1 | * | 6/1993 |
| WO | WO-2005/053392 A1 | * | 6/2005 |
| WO | WO-2005/074680 A1 | * | 8/2005 |
| WO | WO-2007/006103 A1 | * | 1/2007 |

* cited by examiner

HUMANE LEG HOLD TRAP

CROSS REFERENCE TO RELATED APPLICATIONS

This is a non-provisional application based upon U.S. provisional patent application Ser. No. 60/578,256, entitled "HUMANE LEG HOLD TRAP", filed Jun. 9, 2004.

BACKGROUND OF THE INVENTION

1. Field of the Invention

The present invention relates to traps, and, more particularly, to leg hold traps.

2. Description of the Related Art

Trapping is a very old method of hunting, perhaps one of the first. It often requires less time and energy than other methods, and can give an excellent if not predictable result. Trapping is comparatively safe for a hunter and was one of the main economic forces in the early days of North American settlements. Even today many people rely on traps to remove small animals, such as mice.

Traps can be divided into four categories including body gripping traps, snares, cages and leg hold traps. Body gripping traps are designed to quickly kill the animal that is caught. An animal is lured or guided into a preferred position before the trap is triggered. The trap is built to deliver near instant death to the animal. Most, if not all, of the traps of this type rely on blunt force trauma so as to not destroy the pelt of the animal being taken. Snares are one of the simplest traps and can be quite effective. Snares are generally made of a wire and they are cheap to produce and are often set in large numbers. A problem with snares is that they can kill animals for years after the trapper has left the area, since they are often simply abandoned or forgotten since they are so inexpensive. Snares can be of the locking or free running type. A locking snare has a small lock that makes sure that the snare can only get tighter as the animal struggles against it, often leading to strangulation. A free running snare works similar to a leash for a dog, it keeps the animal in place but without hurting it. Cage traps are open cages, usually baited, with a trigger that closes the cage around the animal when it is inside.

Leg hold traps are often made of a rather simple mechanism. They will generally have two jaws, a spring of some sort and a trigger in the middle. When the animal steps on the trigger the trap closes around the leg holding the animal in place. Usually some kind of lure is used to get the animal into position, or the trap is set on an animal trail. Traditionally, the traps had close and tightly closing teeth to make sure that the animal stayed in place. The teeth also made sure the animal could not move a leg in the trap and wear the coat. However, this often resulted in a lot of animals gnawing their way out of the trap. More modern traps have a gap and work more like a handcuff. They grip above the paw, making sure the animal can't pull out from the trap but does not destroy the leg. This allows the trapper to release unwanted catches.

What is needed in the art is a humane leg hold trap that is simple and cost efficient to produce.

SUMMARY OF THE INVENTION

The present invention provides a humane leg hold trap that has few moving parts.

The invention comprises, in one form thereof, a trap including a housing having an inner wall and a first opening and a trigger that is inserted into the first opening. The trigger having an edge contacting the inner wall when the trap is armed.

An advantage of the present invention is that it is easily manufactured.

Another advantage of the present invention is that it humanely holds the leg of an animal allowing a trapper to release unwanted animals without injury.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
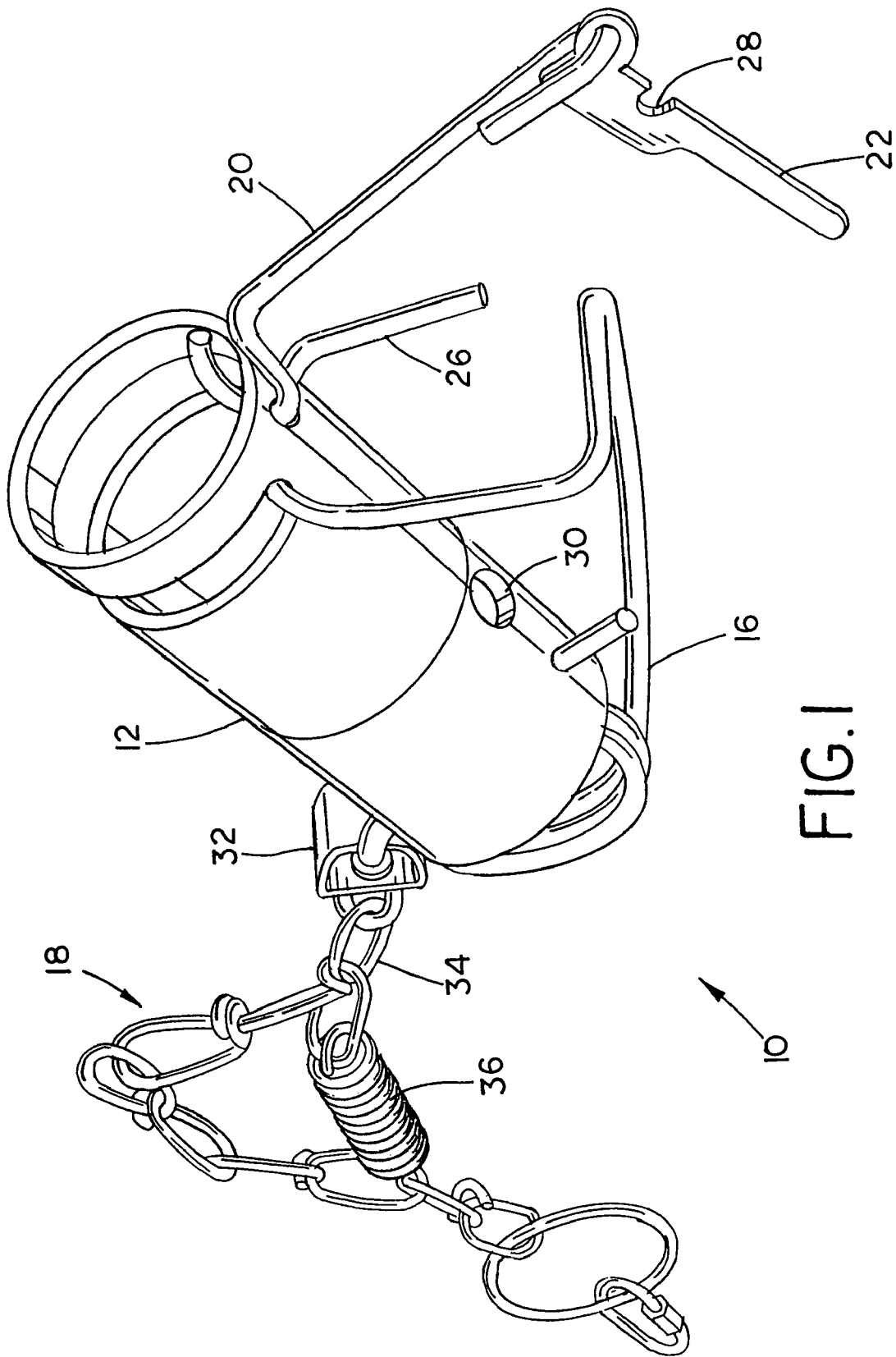
FIG. 1 is a perspective view of an embodiment of a humane leg hold trap according to the present invention in a triggered mode.
Figure 2:
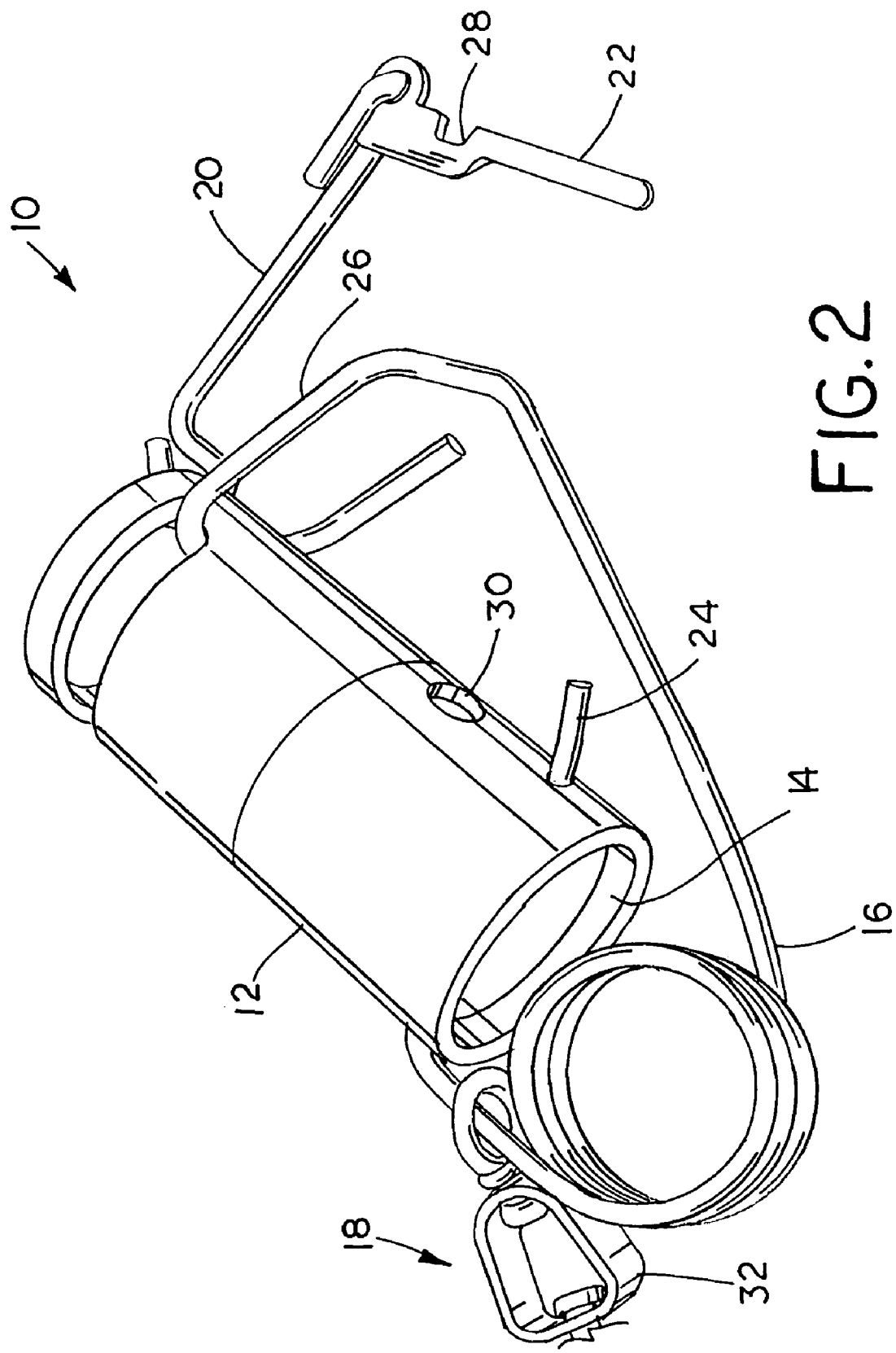
FIG. 2 is another perspective view of the leg hold trap of FIG. 1.
Figure 3:
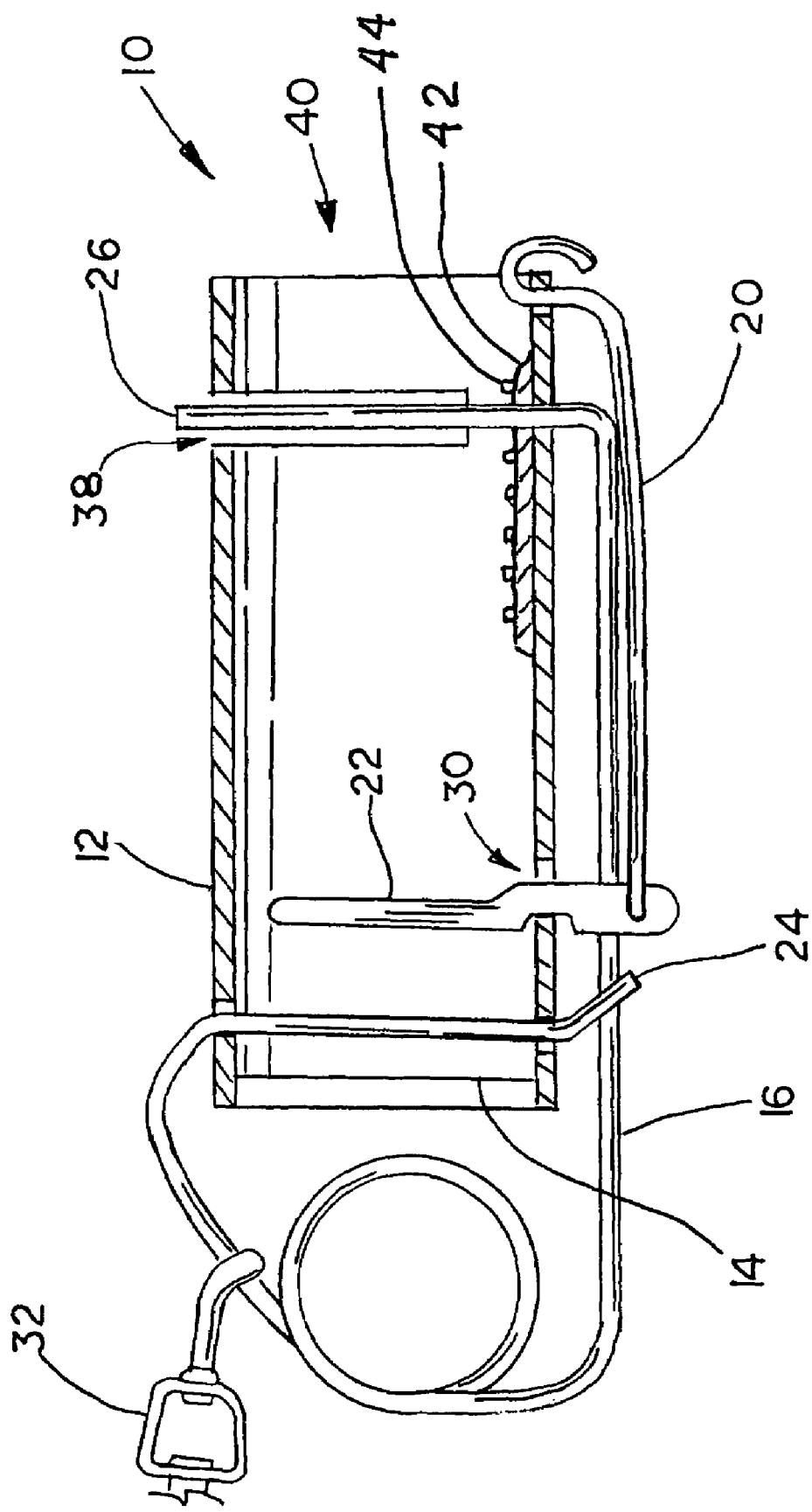
FIG. 3 is a partially sectioned side view of the leg hold trap of FIGS. 1 and 2 in an armed mode.

Referring now to the drawings, and more particularly to FIGS. 1-3, there is shown an embodiment of a humane leg hold trap 10 of the present invention. Trap 10 includes a housing 12, a cap 14, a coil spring 16, an anchor 18, a bail 20 and a trigger 22. Housing 12 includes aligned openings through which a portion of coil spring 16 is inserted. Housing 12 also includes an opening 30, a slot 38 and an opening 40. Cap 14 is pressed into an end of housing 12 so that the animal seeking the bait is forced to reach for it by way of opening 40.

Coil spring 16 includes an end 24, which extends through the aligned openings in Housing 12, near cap 14. Coil spring 16 can be made of an integral resilient material such as spring steel. Once end 24 is inserted through the aligned openings it is bent slightly so as to prevent the removal of coil spring 16 from housing 12. An opposite end 26 of coil spring 16 defines a generally U-shaped leg restraint, which is biased to the position shown in FIGS. 1 and 2, thereby clamping on a leg of a animal, such as a raccoon, when in the actuated position. End 26 is shaped so as to generally conform to a portion of the shape of housing 12 and to fill slot 38 when trap 10 is in an armed position as illustrated in FIG. 3.

Bail 20 is pivotally connected to housing 12 at one end thereof. The opposite end of bail 20 is pivotally connected to trigger 22. Trigger 22 has an edge 28, that may be in the form of a notch 28, which engages a portion of hole 30, which is close to end 24, when trigger 22 is in an armed position.

A resilient pad 42 is attached to an inner wall of housing 12 so as to cushion the leg of an animal caught in trap 10. Resilient pad 42 has protrusions 44 that are also of a resilient nature to help hold the leg of the animal from moving and damaging the leg.

Anchor 18 includes a double swivel 32 which interconnects with chain 34 and with either spring 16 or housing 12. A spring 36 acts shorten the extent of chain 34, to provide a resilient force against an animal trying to free itself from trap 10. Slot 38 in housing 12 extends over three-fourths of the circumference of housing 12. As depicted in FIGS. 1-3, housing 12 may be a cylindrical tube with cap 14 closing one end thereof. Leg restraint end 26 is shaped to substantially fit in slot 38 to allow an animal to insert its leg into opening 40, and to grasp at bait contained in housing 12 underneath trigger 22.

To set leg hold trap 10, leg restraint end 26 is depressed such that the generally U-shaped portion thereof lies within slot 38. Bail 20 is then pivoted to lie over a transverse portion of leg restraint end 26 and trigger 22 is placed within hole 30. Notch 28 is engaged with a peripheral side of hole 30. A bait is either placed on trigger 22 or behind trigger 22, prior to the insertion of trigger 22 into hole 30, adjacent cap 14. When an animal, such as a raccoon, reaches in to remove the bait, trigger 22 is moved causing notch 28 to disengage from the side of hole 30, thereby allowing bail 20 to pivot out of the way with leg restraint end 26 grabbing the leg of the animal by biasing the leg against an interior side of housing 12 adjacent bail 20.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A trap, comprising:
   a housing having an animal entry opening at a first end of said housing, a cylindrical inner wall, and a first opening through said cylindrical inner wall;
   a bail having a first end and a second end, said first end of said bail being pivotally connected to said housing at a location on said housing between said animal entry opening at said first end and said first opening;
   a trigger that is inserted into said first opening to arm the trap, said trigger having an edge, said edge configured to contact said cylindrical inner wall only when the trap is armed, said trigger being pivotally connected to said second end of said bail; and
   an integral single piece bent resilient metal member comprising a spring portion, a first end portion and a second end portion, said first end portion being anchored to said housing, said second end portion being generally shaped to conform to said inner wall, said second end portion being configured to be proximate to said inner wall when the trap is armed, said trigger being completely removed from said first opening when the trap is tripped, said trigger not being connected to said bent resilient metal member, said spring portion being positioned outside of said housing at a second end of said housing opposite said first end, and said spring portion both being intermediate the first and second end portions and extending transversely across said second end of said housing.

2. The trap of claim 1, wherein said housing includes a second opening, said second end portion of said bent resilient member being positioned in said second opening when the trap is armed.

3. The trap of claim 2, wherein said second opening is a slot in said housing.

4. The trap of claim 3, wherein said bent resilient member traverses a substantial portion of said slot when the trap is tripped.

5. The trap of claim 1, further comprising a resilient pad attached to said inner wall.

6. A leg hold trap, comprising:
   a tube having a plurality of openings including a first opening, a second opening, a third opening at one end of said tube, and a fourth opening;
   a bail having a first end and a second end, said first end of said bail being pivotally coupled to said tube proximate said third opening at a location on said tube between said third opening and said fourth opening;
   a trigger pivotally connected to said second end of said bail, said trigger being inserted through the fourth opening to arm the trap; and
   a biased restraint mechanism entirely made of a single piece of spring steel wire having a first end and a second end, said first end being inserted through said first opening, said second end positioned in said second opening proximate to said third opening, said biased restraint mechanism including a spring portion between said first end and said second end, said first end being anchored to and extending through said tube, said second end being generally shaped to conform to an inner wall of said tube, said second end being configured to be proximate to said inner wall when the trap is armed, said spring portion both being positioned outside of said tube at an other end of said tube opposite said third opening at said one end of said tube and extending transversely across the other end of said tube.

7. The leg hold trap of claim 6, wherein said spring portion includes a multi-turn loop.

8. The leg hold trap of claim 6, wherein said trigger includes a notch that interfaces with said tube adjacent to said fourth opening when the trap is armed.

9. The leg hold trap of claim 8, wherein said trigger extends substantially into said tube when the trap is armed.

10. The leg hold trap of claim 6, wherein said tube is cylindrical having a circumference, said second opening being a slot that extends greater than one-half of said circumference.

11. The leg hold trap of claim 10, wherein said slot extends over approximately three-fourths of said circumference.

12. A trap, comprising:
   a housing having a cylindrical inner wall, a first opening through said cylindrical inner wall, a second opening, and a third opening at one end of said housing;
   a bail having a first end and a second end, said first end being pivotally coupled to said tube proximate said third opening at a location on said housing between said third opening at said one end and said first opening;
   a biasing mechanism with an integral restraint, said restraint proximate said second opening, said biasing mechanism being an integral bent resilient structural member consisting of a single piece of bent metal wire having a first end and a second end, said first end being anchored to said housing, said second end being generally shaped to conform to said inner wall and including said integral restraint, said second end being configured to be proximate to said inner wall when the trap is armed, said biasing mechanism having a string portion intermediate said first and second ends of said biasing mechanism, said string portion both being positioned outside of said housing at an other end of said housing opposite said third opening at said one end of said housing and extending transversely across the other end of said housing; and
   a trigger that is inserted into said first opening to arm the trap, said trigger having an edge contacting said inner wall when the trap is armed, said trigger being pivotally connected to said second end of said bail.

* * * * *